(12) United States Patent
Wang

(10) Patent No.: US 12,241,358 B2
(45) Date of Patent: *Mar. 4, 2025

(54) APPARATUS AND METHODS FOR MAKING AZIMUTHAL RESISTIVITY MEASUREMENTS

(71) Applicant: WELL RESOLUTIONS TECHNOLOGY, Houston, TX (US)

(72) Inventor: Tsili Wang, Houston, TX (US)

(73) Assignee: WELL RESOLUTIONS TECHNOLOGY

( * ) Notice: Subject to any disclaimer, the term of this patent is extended or adjusted under 35 U.S.C. 154(b) by 98 days.

This patent is subject to a terminal disclaimer.

(21) Appl. No.: 17/322,165

(22) Filed: May 17, 2021

(65) Prior Publication Data

US 2021/0277764 A1    Sep. 9, 2021

Related U.S. Application Data

(60) Continuation of application No. 16/379,261, filed on Apr. 9, 2019, now Pat. No. 11,008,850, which is a
(Continued)

(51) Int. Cl.
*G01V 3/26*    (2006.01)
*E21B 7/06*    (2006.01)
(Continued)

(52) U.S. Cl.
CPC ............ *E21B 44/005* (2013.01); *E21B 7/062* (2013.01); *E21B 47/024* (2013.01); *E21B 47/09* (2013.01);
(Continued)

(58) Field of Classification Search
CPC ............... G01V 3/18; G01V 3/26; G01V 3/28
See application file for complete search history.

(56) References Cited

U.S. PATENT DOCUMENTS

| 4,636,731 A | 1/1987 | Savage |
| 5,491,488 A | 2/1996 | Wu |

(Continued)

OTHER PUBLICATIONS

Int'l Search Report and Written Opinion (PCT/US2014/042192), dated Dec. 22, 2014 (cited in Parent U.S. Appl. No. 14/303,232, filed Jun. 12, 2014.
(Continued)

*Primary Examiner* — Lee E Rodak
*Assistant Examiner* — Demetrius R Pretlow
(74) *Attorney, Agent, or Firm* — Hunton Andrews Kurth LLP

(57) ABSTRACT

A resistivity measuring tool used in a drillstring having a drill bit on a distal end for drilling a wellbore in a formation includes a tool body having a longitudinal axis, a transmitting antenna, and a receiving antenna. The receiving antenna includes an antenna body having a longer axis disposed longitudinally in the tool body, and a wire coil having a central axis disposed around the antenna body, wherein the wire coil central axis is substantially perpendicular to the longer axis of the antenna body, and wherein the wire coil is configured to generate a magnetic moment orthogonal to the tool body longitudinal axis. The transmitting antenna is configured to transmit electromagnetic energy into the formation and induce a voltage signal related to a parameter of the formation in the receiving antenna.

18 Claims, 10 Drawing Sheets

Related U.S. Application Data continuation of application No. 15/920,034, filed on Mar. 13, 2018, now Pat. No. 10,253,614, which is a continuation of application No. 15/696,543, filed on Sep. 6, 2017, now Pat. No. 9,952,347, which is a continuation of application No. 15/466,507, filed on Mar. 22, 2017, now Pat. No. 9,767,153, which is a division of application No. 14/993,165, filed on Jan. 12, 2016, now Pat. No. 9,645,276, which is a division of application No. 14/303,232, filed on Jun. 12, 2014, now Pat. No. 9,268,053.

(60) Provisional application No. 61/834,272, filed on Jun. 12, 2013.

(51) Int. Cl.

| | |
|---|---|
| E21B 44/00 | (2006.01) |
| E21B 47/024 | (2006.01) |
| E21B 47/09 | (2012.01) |
| E21B 49/00 | (2006.01) |
| G01V 3/12 | (2006.01) |
| G01V 3/28 | (2006.01) |
| G01V 3/30 | (2006.01) |
| G01V 3/34 | (2006.01) |
| G06F 16/2455 | (2019.01) |
| G06F 16/2457 | (2019.01) |
| E21B 17/10 | (2006.01) |

(52) U.S. Cl.
CPC ............... *E21B 49/00* (2013.01); *G01V 3/12* (2013.01); *G01V 3/26* (2013.01); *G01V 3/28* (2013.01); *G01V 3/30* (2013.01); *G01V 3/34* (2013.01); *G06F 16/24554* (2019.01); *G06F 16/24578* (2019.01); *E21B 17/1078* (2013.01)

(56) References Cited

U.S. PATENT DOCUMENTS

| | | | |
|---|---|---|---|
| 5,757,191 A | 5/1998 | Gianzero | |
| 6,068,394 A | 5/2000 | Dublin et al. | |
| 6,084,052 A | 7/2000 | Aufdermarsh et al. | |
| 6,100,696 A * | 8/2000 | Sinclair | G01V 3/28 324/369 |
| 6,163,155 A | 12/2000 | Bittar | |
| 6,297,639 B1 | 10/2001 | Clark et al. | |
| 6,351,127 B1 * | 2/2002 | Rosthal | G01V 3/28 324/338 |
| 6,380,744 B2 | 4/2002 | Clark et al. | |
| 6,476,609 B1 | 11/2002 | Bittar | |
| 6,483,310 B1 * | 11/2002 | Meador | G01V 3/30 324/369 |
| 6,509,738 B1 | 1/2003 | Minerbo et al. | |
| 6,577,129 B1 | 6/2003 | Thompson et al. | |
| 6,646,441 B2 | 11/2003 | Thompson et al. | |
| 6,690,170 B2 | 2/2004 | Homan et al. | |
| 6,703,837 B1 | 3/2004 | Wisler et al. | |
| 6,911,824 B2 | 6/2005 | Bittar | |
| 6,969,994 B2 | 11/2005 | Minerbo et al. | |
| 7,019,528 B2 | 3/2006 | Bittar | |
| 7,057,392 B2 | 6/2006 | Wang et al. | |
| 7,138,803 B2 | 11/2006 | Bittar | |
| 7,265,552 B2 | 9/2007 | Bittar | |
| 7,327,145 B2 | 2/2008 | Hauglang | |
| 7,345,487 B2 | 3/2008 | Bittar et al. | |
| 7,375,530 B2 | 5/2008 | Chemali et al. | |
| 7,382,135 B2 | 6/2008 | Li et al. | |
| 7,394,257 B2 | 7/2008 | Martinez et al. | |
| 7,414,407 B2 | 8/2008 | Wang et al. | |
| 7,471,088 B2 | 12/2008 | Yu et al. | |
| 7,483,793 B2 | 1/2009 | Wang et al. | |
| 7,536,261 B2 | 5/2009 | Omeragic et al. | |
| 7,557,579 B2 | 7/2009 | Bittar | |
| 7,557,580 B2 | 7/2009 | Bittar | |
| 7,619,540 B2 | 11/2009 | Bonner | |
| 7,659,722 B2 | 2/2010 | Bittar | |
| 7,669,668 B2 | 3/2010 | Martinez | |
| 7,723,991 B2 | 5/2010 | Signorelli et al. | |
| 7,848,887 B2 | 12/2010 | Yang et al. | |
| 7,888,940 B2 | 2/2011 | Hall | |
| 7,894,990 B2 | 2/2011 | Wang et al. | |
| 7,912,648 B2 | 3/2011 | Tang et al. | |
| 7,948,238 B2 | 5/2011 | Bittar | |
| 7,990,153 B2 | 8/2011 | Streinz et al. | |
| 7,991,555 B2 | 8/2011 | Yang et al. | |
| 8,085,049 B2 | 12/2011 | Bittar | |
| 8,085,050 B2 | 12/2011 | Bittar et al. | |
| 8,089,268 B2 | 1/2012 | Wang | |
| 8,159,227 B2 | 4/2012 | Wang | |
| 8,749,243 B2 * | 6/2014 | Bittar | E21B 47/0228 324/346 |
| 8,890,531 B2 | 11/2014 | Beste | |
| 9,268,053 B2 | 2/2016 | Wang | |
| 10,365,391 B2 | 7/2019 | Wang | |
| 11,008,850 B2 * | 5/2021 | Wang | G01V 3/30 |
| 2002/0105333 A1 | 8/2002 | Amini | |
| 2002/0167418 A1 | 11/2002 | Goswami | |
| 2003/0184488 A1 | 10/2003 | Smith | |
| 2004/0123655 A1 | 7/2004 | MacPherson | |
| 2005/0006090 A1 * | 1/2005 | Chemali | G01V 3/30 166/250.01 |
| 2005/0087367 A1 | 4/2005 | Hutchinson | |
| 2005/0099184 A1 | 5/2005 | Gianzero | |
| 2005/0189945 A1 * | 9/2005 | Reiderman | G01V 3/28 324/333 |
| 2005/0212520 A1 * | 9/2005 | Homan | G01V 3/30 324/343 |
| 2006/0125479 A1 * | 6/2006 | Chemali | E21B 47/022 324/339 |
| 2006/0157277 A1 | 7/2006 | Bittar | |
| 2006/0290529 A1 | 12/2006 | Flanagan | |
| 2008/0053707 A1 | 3/2008 | Martinez et al. | |
| 2008/0074336 A1 | 3/2008 | Signorelli | |
| 2008/0158082 A1 | 7/2008 | Wang | |
| 2008/0224707 A1 | 9/2008 | Wisler et al. | |
| 2009/0278543 A1 | 11/2009 | Beste | |
| 2009/0295393 A1 | 12/2009 | Bespalow et al. | |
| 2009/0301781 A1 * | 12/2009 | Fang | E21B 47/01 175/50 |
| 2009/0302847 A1 * | 12/2009 | Knizhnik | H01Q 3/26 324/332 |
| 2010/0097067 A1 * | 4/2010 | Synder, Jr. | G01V 3/28 324/339 |
| 2010/0117855 A1 | 5/2010 | Sinclair | |
| 2010/0123462 A1 | 5/2010 | Bittar | |
| 2010/0244841 A1 | 9/2010 | Wang | |
| 2010/0244842 A1 | 9/2010 | Wang | |
| 2010/0277176 A1 | 11/2010 | Homan et al. | |
| 2010/0286916 A1 | 11/2010 | Wang | |
| 2010/0295547 A1 * | 11/2010 | Hall | G01V 3/28 324/339 |
| 2011/0057656 A1 | 3/2011 | Tchakarov et al. | |
| 2011/0074427 A1 * | 3/2011 | Wang | G01V 3/28 324/339 |
| 2011/0074428 A1 | 3/2011 | Wang | |
| 2011/0084697 A1 | 4/2011 | Wisler et al. | |
| 2011/0084698 A1 | 4/2011 | Wisler | |
| 2011/0084699 A1 | 4/2011 | Wisler et al. | |
| 2011/0161009 A1 | 6/2011 | Wang | |
| 2011/0187373 A1 | 8/2011 | Wisler et al. | |
| 2011/0238312 A1 | 9/2011 | Seydoux et al. | |
| 2011/0068797 A1 | 10/2011 | Hall et al. | |
| 2011/0308794 A1 | 12/2011 | Bittar | |
| 2012/0209528 A1 | 8/2012 | Itskovich | |
| 2013/0038332 A1 | 2/2013 | Graf | |
| 2013/0046474 A1 | 2/2013 | Bittar et al. | |
| 2013/0168081 A1 | 7/2013 | Yang | |
| 2013/0226459 A1 | 8/2013 | Gorek | |
| 2013/0234717 A1 | 9/2013 | Wang | |
| 2013/0241561 A1 | 9/2013 | Allen | |
| 2013/0261975 A1 | 10/2013 | Yang | |

(56) References Cited

U.S. PATENT DOCUMENTS

| | | |
|---|---|---|
| 2013/0320985 A1 | 12/2013 | Liu et al. |
| 2014/0285205 A1 | 9/2014 | Okonkwo |
| 2014/0312906 A1 | 10/2014 | Gold |
| 2014/0368197 A1 | 12/2014 | Wang |
| 2014/0368200 A1* | 12/2014 | Wang .................. G01V 3/00 |
| | | 324/338 |
| 2014/0368380 A1 | 12/2014 | Wang |
| 2015/0240582 A1 | 8/2015 | Bansal et al. |
| 2015/0293254 A1* | 10/2015 | Wang .................. E21B 49/00 |
| | | 324/355 |
| 2015/0345283 A1 | 12/2015 | Switzer et al. |
| 2016/0230546 A1 | 8/2016 | Braisher et al. |
| 2018/0074219 A1 | 3/2018 | Wang |
| 2019/0234196 A1* | 8/2019 | Wang .................. E21B 49/00 |

OTHER PUBLICATIONS

Extended European Search Report dated Jan. 9, 2017 issued in EP 14811280 [cited in parent U.S. Appl. No. 14/993,165, filed Jan. 12, 2016).

Non-Final Office Action dated Dec. 8, 2023 issued in U.S. Appl. No. 18/090,209.

International Search Report and Written Opinion dated Feb. 23, 2024 issued in PCT/US2023/086198.

Non-Final Office Action dated Aug. 28, 2024 issued in U.S. Appl. No. 18/090,209.

\* cited by examiner

APPARATUS AND METHODS FOR MAKING AZIMUTHAL RESISTIVITY MEASUREMENTS

CROSS-REFERENCE TO RELATED APPLICATIONS

This application is a continuation of U.S. application Ser. No. 16/379,261, filed Apr. 9, 2019, which is a continuation of Ser. No. 15/920,034, filed Mar. 13, 2018 and issuing as U.S. Pat. No. 10,253,614 which is a continuation of U.S. application Ser. No. 15/696,543, filed Sep. 6, 2017 and now issued as U.S. Pat. No. 9,952,347, which is a continuation of U.S. application Ser. No. 15/466,507, filed Mar. 22, 2017 and now issued as U.S. Pat. No. 9,767,153, which claims priority to U.S. application Ser. No. 14/993,165, filed Jan. 12, 2016 and now issued as U.S. Pat. No. 9,645,276, which claims priority to U.S. application Ser. No. 14/303,232, filed Jun. 12, 2014, and now issued as U.S. Pat. No. 9,268,053, which claims priority to U.S. Provisional Application No. 61/834,272 filed Jun. 12, 2013, all of which are incorporated herein by reference in their entireties.

FIELD

Embodiments disclosed herein relate to, for example, apparatus and methods for making azimuthal electromagnetic resistivity measurements.

BACKGROUND AND SUMMARY

Well logging, also known as borehole logging, is the practice of making a detailed record (a well log) of the geologic formations penetrated by a borehole. Resistivity logging is a method of well logging that works by characterizing the rock or sediment in a borehole by measuring its electrical resistivity. Resistivity is a fundamental material property which represents how strongly a material opposes the flow of electric current. Most rock materials are essentially insulators, while their enclosed fluids are conductors. Hydrocarbon fluids are an exception, because they are almost infinitely resistive. When a formation is porous and contains salty water, the overall resistivity will be low. When the formation contains hydrocarbons, or contains very low porosity, its resistivity will be high. High resistivity values may indicate a hydrocarbon bearing formation.

In one aspect, embodiments disclosed herein relate to a resistivity measuring tool used in a drillstring having a drill bit on a distal end for drilling a wellbore in a formation. The tool includes a tool body having a longitudinal axis, a transmitting antenna, and a receiving antenna. The receiving antenna includes an antenna body having a longer axis disposed longitudinally in the tool body, and a wire coil having a central axis disposed around the antenna body, wherein the wire coil central axis is substantially perpendicular to the longer axis of the antenna body, and wherein the wire coil is configured to generate a magnetic moment orthogonal to the tool body longitudinal axis. The transmitting antenna is configured to transmit electromagnetic energy into the formation and induce a voltage signal related to a parameter of the formation in the receiving antenna.

DETAILED DESCRIPTION

A downhole resistivity measuring tool suitable for use in any downhole environment is disclosed. A drill bit is secured to the lower end of the drill collar measurement tubular for drilling a rock formation. The measurement tubular may also include a resistivity measuring tool, communications package, and other downhole measurement tools to measure, for example, the acoustic velocity, the natural radiation, and the density of the formation surrounding the wellbore. The resistivity measuring tool disclosed may be used both when the measurement tubular is rotating, slowly rotating, or not rotating. The communications package communicates between the electromagnetic resistivity tool and other downhole measurement tools and a surface control system by any means. For example, the communications package may use mud pulse telemetry and electrical telemetry techniques for communicating with a surface control system. The measurement tool includes a sensor configured to measure the angular position of the tool body relative to the wellbore.

Resistivity measuring tools use an electric coil to generate an alternating current loop in the formation by induction. The alternating current loop, in turn, induces a voltage signal in a receiving coil located elsewhere in the tool. The voltage signal induced in the receiving coil is related to a parameter of the formation. Multiple transmitting and receiving coils may be used to focus formation current loops both radially (depth of investigation) and axially (vertical resolution).

As used herein in reference to antennas, "transverse" refers to a magnetic moment, created by electrical current in a wire loop, having a direction orthogonal or substantially orthogonal relative to a longitudinal axis of the tool body. "Axial" refers to a magnetic moment, created by electrical current in a wire loop, having a direction aligned or substantially aligned or parallel with a longitudinal axis of the tool body.

For frame of reference and as used herein, the Z-axis points along a longitudinal axis of the tool body. The X-axis falls in a gravity plane containing the Z-axis. In a tool including transmitter and receiver antennas oriented in the X, Y, or Z directions, nine different combinations of transmitter and receiver antennas are possible: XX, XY, XZ, YX, YY, YZ, ZX, ZY, and ZZ, where the first letter indicates the orientation of the transmitter antenna and the second letter the orientation of the receiver antenna. Those combinations provide means to image the formation around a borehole. In particular, the XZ, ZX, YZ, and ZY components or their combinations provide the most useful azimuthal resistivity measurement for resolving an adjacent boundary or other geological features around a wellbore.

Figure 1A:
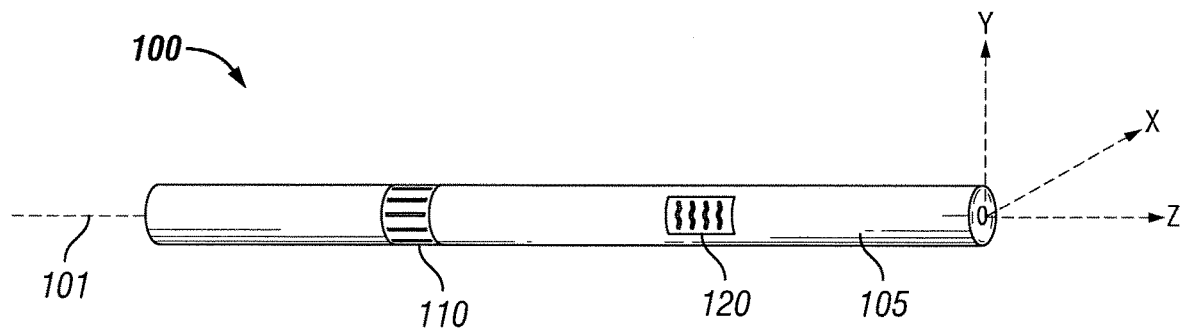
FIGS. 1A-C illustrate embodiments of an azimuthal resistivity measurement tool having a transverse elemental antenna.
Figure 1B:
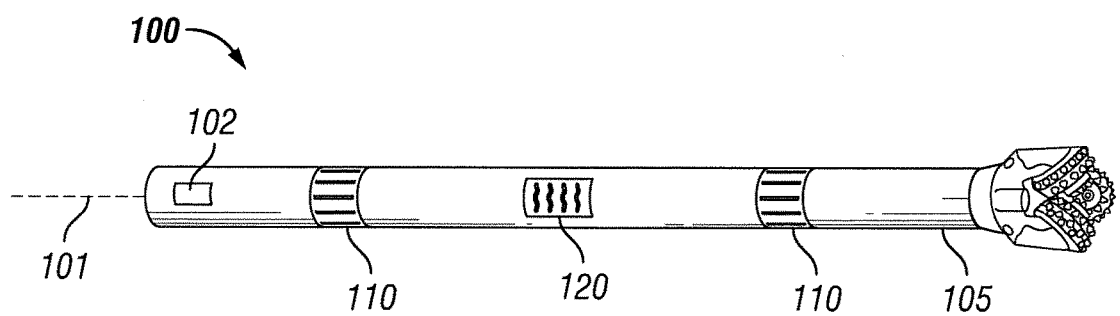
Figure 1C:
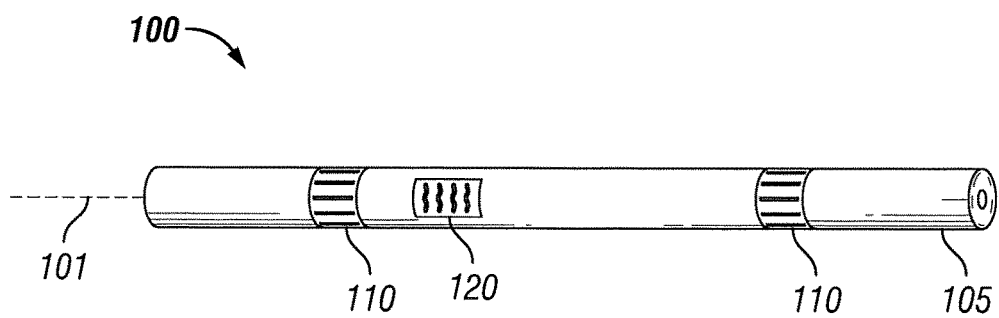

FIGS. 1A-C illustrate embodiments of a resistivity measuring tool 100 including a transverse receiving antenna 120 and an axial transmitting antenna 110. The axial transmitting antenna 110 may be placed in either the uphole direction or the downhole direction relative to the transverse receiving antenna 120. The receiving antenna 120 is spaced apart from the transmitting antenna 110 at a predefined distance. The direction of the magnetic moment of the axial transmitting antenna 110 remains substantially unchanged as the measurement tool 100 rotates, whereas that of the transverse receiving antenna 120 rotates with the tool 100. To make an azimuthal measurement, a current (e.g., alternating) is driven to the axial transmitting antenna 110 (also known as firing the antenna) at moments controlled by a microcontroller (not shown) of the tool to transmit electromagnetic waves into the surrounding medium at a selected frequency. The transmitted signal, when encountering a resistivity boundary near the borehole, is reflected back and received by the transverse receiving antenna 120. The detected voltage signal is recorded at one or more tool face angles as the tool rotates. The measurement tool includes a sensor 102 configured to measure the angular position of the tool body relative to the wellbore (e.g., tool face angles). For example, the sensor 102 may be an accelerometer, a magnetometer, a gyro, or any other known sensor or sensor combination. If multiple transverse receiving antennas are used, the reflected electromagnetic wave may be detected simultaneously by the receiving antennas.

FIGS. 1B and 1C illustrate embodiments of a resistivity measuring tool 100 including a transverse receiving antenna 120 and a pair of symmetrical (FIG. 1B) or asymmetrical (FIG. 1C) axial transmitting antennas 110. The pair of axial transmitting antennas 110 may be energized sequentially or simultaneously as explained later. And as further discussed below, by combining and processing the signals due to the two axial transmitting antennas, whether fired sequentially or simultaneously, a formation resistivity anisotropy effect on the azimuthal measurement may be reduced or removed, leaving the processed response largely sensitive to an adjacent bed boundary. Alternatively, the signals generated by the two axial transmitting antennas 110 may be processed to remove or reduce the bed boundary effect and enhance the formation resistivity anisotropy effect.

Figure 2A:
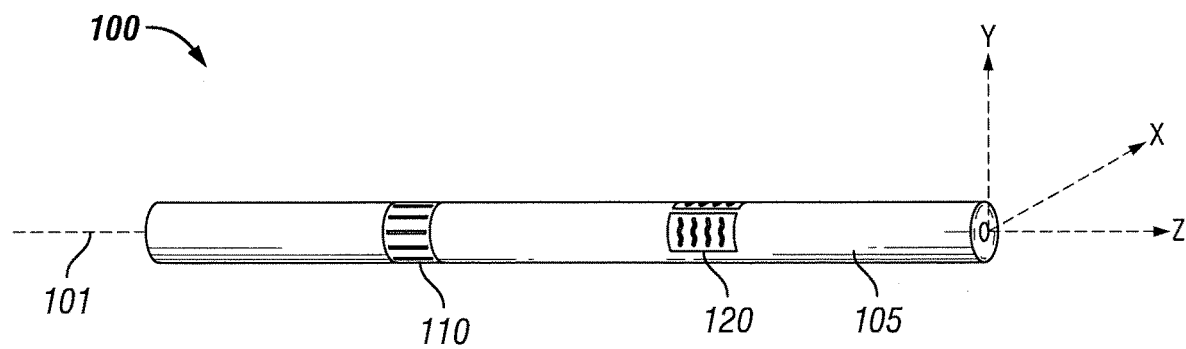
FIGS. 2A-B illustrate embodiments of an azimuthal resistivity measurement tool having multiple azimuthally-spaced transverse elemental antennas.
Figure 2B:
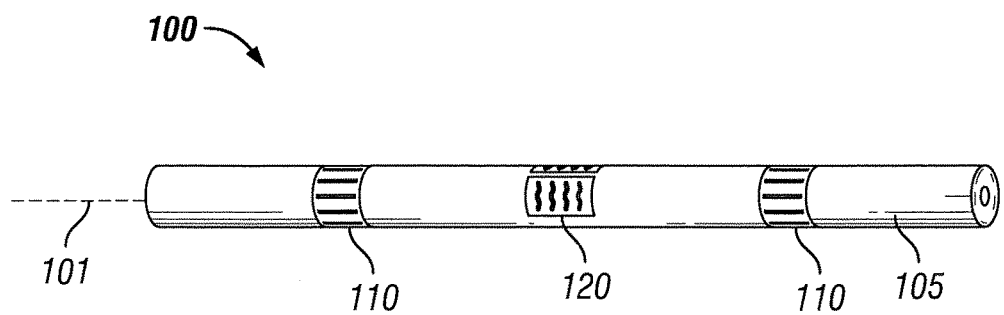

FIGS. 2A and 2B illustrate an embodiment of a resistivity measuring tool 100. Multiple transverse receiving antennas 120 are located around a circumference of the tool body 105 and separated by varying angles in the azimuthal direction, preferably 90 degrees in the azimuthal direction, although a different separation angle may also be used. For example, in certain embodiments, two transverse antennas may be separated by at least about 30 degrees, at least about 45 degrees, or at least about 60 degrees. Transverse receiving antennas are preferably located at substantially the same longitudinal position (e.g., along the Z-axis) on the tool axis but may be located at different longitudinal positions as well. One or more axial transmitting antennas 110 are preferably placed longitudinally on opposite sides of the receiving antenna(s) 120, although they may also be placed on the same side of the receiving antenna(s) 120. When more than one axial transmitting antennas 110 are used, they may be fired sequentially or simultaneously. The measured signals due to the two transmitting antennas 110 may be processed to either remove or enhance the formation resistivity anisotropy effect, discussed in greater detail below. The resistivity measuring tool having multiple transverse receiving antennas azimuthally-spaced around the tool body may be more preferably used to measure formation resistivity when the tool is slowly rotating or not rotating.

Figure 3:
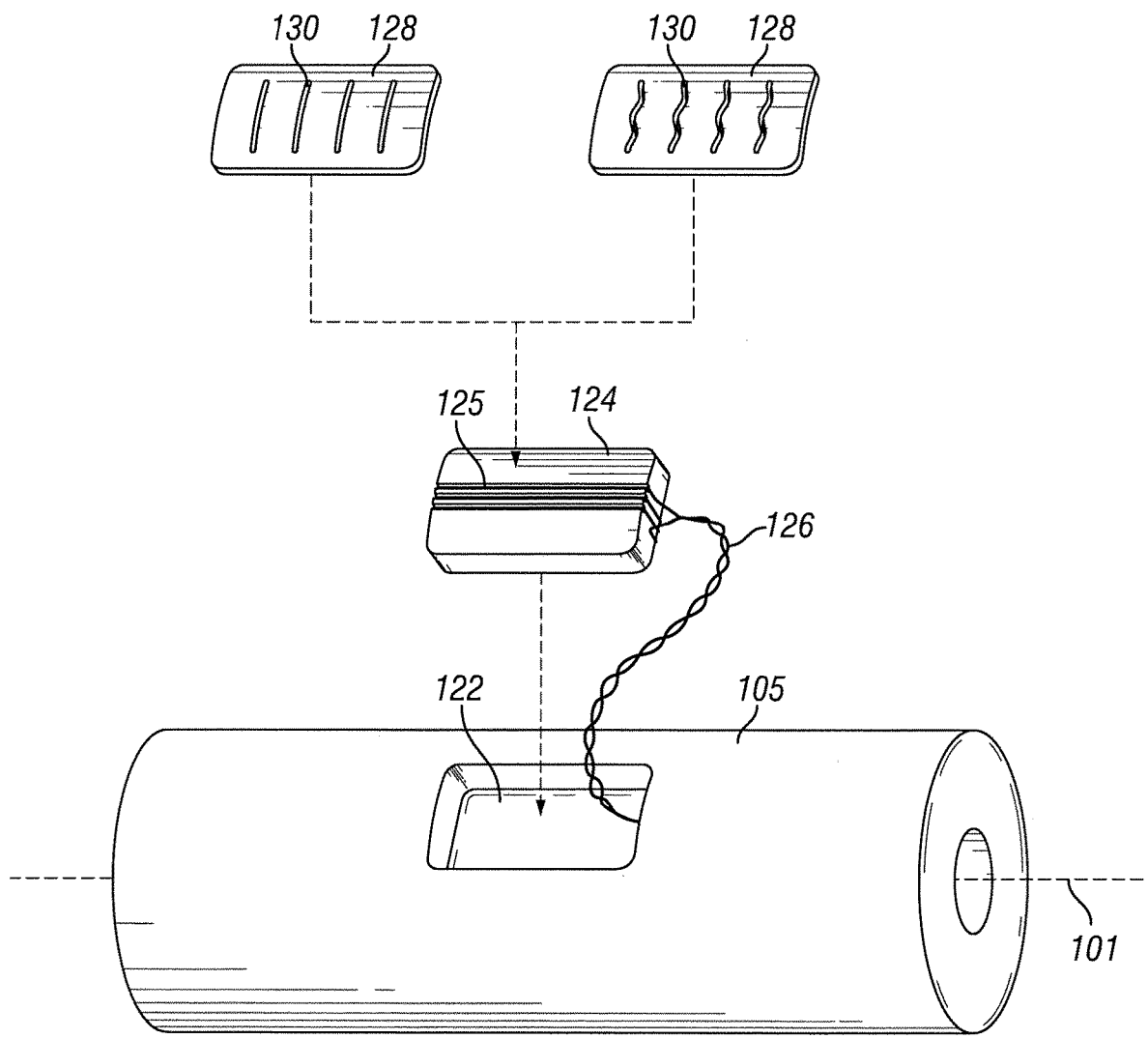
FIG. 3 illustrates an embodiment of transverse elemental antenna components.

FIG. 3 illustrates an embodiment of transverse antenna components. An antenna pocket 122 is formed (e.g., machined, molded, etc.) near an outer surface of a drill collar body 105. The pocket 122 extends radially inward from the outer surface of the drill collar body to a maximum radial depth of one half a diameter of the tool body. Preferably, the pocket may be at least 0.25 inches deep, or up to 0.5 inches deep, or up to about one inch deep, or deeper. The pocket 122 may be any shape including square, rectangle, circle, ellipse or other shapes. In the case of a square or rectangle pocket, the corners of the pocket may be smoothed to reduce stress accumulation around the corners. An antenna body 124 is configured to substantially correspond in shape with and to fit within the pocket 122. The antenna body 124 may be made of any non-conducting material, including but not limited to as PEEK, fiberglass, or ceramic. An antenna wire 126 is wound around the antenna body 124 such that the wire 126 extends substantially along the longitudinal direction (Z-axis) of the tool axis 101. One or multiple turns of wire may be wound around the antenna body 124. To help hold the wire in place, wire grooves 125 may be formed on the outer surface of the antenna body 124. The wire 126 may be insulated with Teflon or other non-conducting material to prevent short-circuiting between turns and from being exposed to drilling fluids. The antenna body 126 with the wound antenna wire 125 is inserted into the antenna pocket 122 such that the moment of the antenna points in a transversal direction. The ends of the antenna wire 125 exit the antenna pocket 122 to a nearby pocket (not shown) formed in the collar body 105 where a preamplifier may be placed to amplify the received signal before the signal is fed to an electronic board (not shown).

An antenna shield 128 may be placed over the antenna body 124 after it is inserted within the antenna pocket 122. Preferably, the antenna shield is configured to sit flush with an outer surface of the collar body 105. The antenna shield 128 may be made of the same material as the collar body 105, or a different, preferably harder, material. In one embodiment, the antenna shield and collar body may be made of stellite. One or more openings 130 may be formed in the antenna shield 128 to allow electromagnetic energy to pass through. The openings 130 are preferably aligned in the azimuthal direction. The antenna shield 128 may be attached to the collar body 105 either with bolts or by welding or other means.

Non-conducting, abrasion-resistant materials, or potting material, may be used to fill any remaining voids or cavities within the antenna pocket 122, after the antenna body 124 is inserted and the antenna shield 128 is attached, for further protection of the antenna wire 126. To increase the antenna efficiency, the potting material may be mixed with magnetic materials so that the mixture has a relative magnetic permeability greater than 1. Such a transversal antenna may be referred to as an "elemental" transverse antenna. Because the shield openings extend substantially along the circumferential direction, they may be subject to wear and tear during drilling. To help protect the potting material from being damaged or worn out, the shield openings may be narrow. To further protect the potting material, curved openings may be used instead of straight openings. Each curved opening is preferably symmetric with respect to the center point of the opening.

Figure 4A:
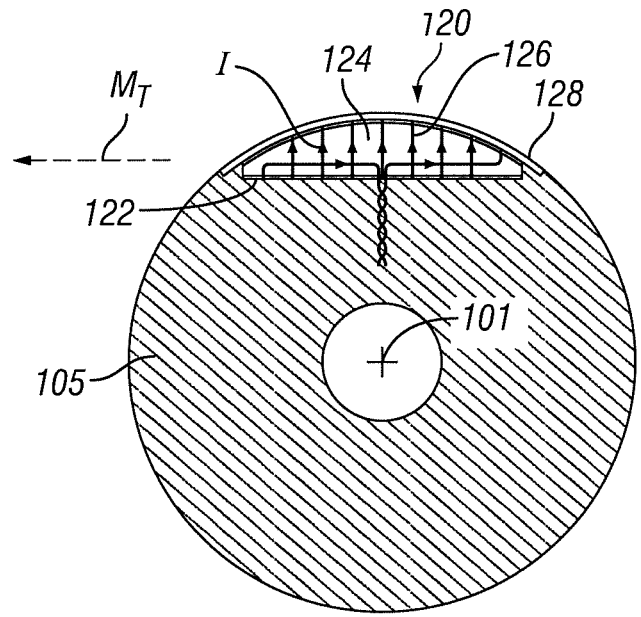
FIGS. 4A-D illustrate embodiments of composite transverse antenna configurations.
Figure 4B:
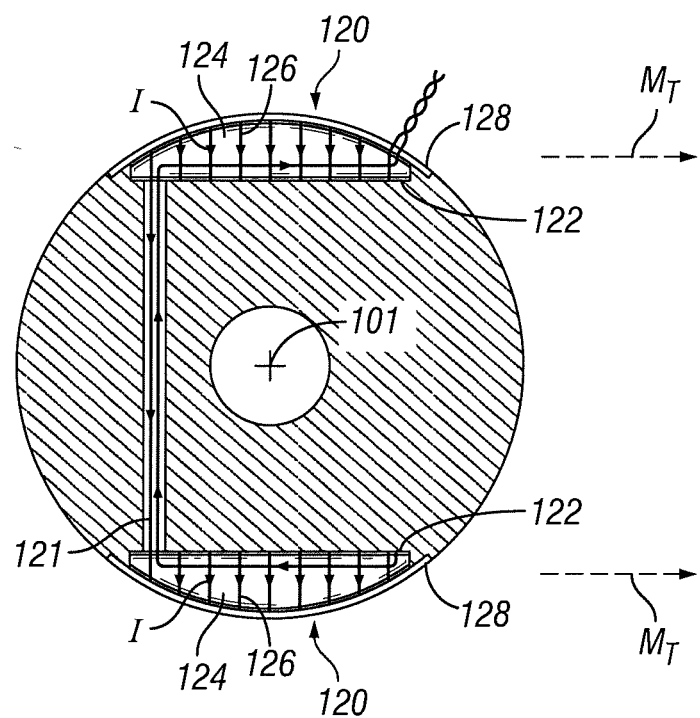

FIGS. 4A-D illustrate cross-section views of a collar body 105 having a pair of transverse elemental antennas 120 combined to form a composite transverse antenna. Any number of composite transverse antenna configurations may be formed. FIG. 4A illustrates an antenna body 124 and antenna wire winding 126 within a pocket 122 and covered by an antenna shield 128, forming a transverse elemental antenna 120. Current "I" flows in the antenna wire winding 126 in a direction shown by the arrows to generate a transverse magnetic moment $M_T$ substantially orthogonal to the tool body axis. FIG. 4B illustrates a pair of transverse elemental antennas 120 disposed opposite each other on the collar body 105 and connected to form a composite transverse antenna. The transverse elemental antennas 120 may be connected by a wire 121 of any diameter that extends from one transverse antenna to the other. The connecting wire 121 may be disposed within the collar body 105 for damage protection, for example, extending through a drilled hole in the collar body 105 starting from one transverse elemental antenna 120 and ending at the second transverse elemental antenna 120. Alternatively, a groove may be machined on an outer surface of the collar body 105, the wire 121 disposed within the groove running between the two transverse antennas, and the groove welded for mechanical protection. Yet other means of wire connection between two transverse elemental antennas are possible. For instance, the wire from each transverse elemental antenna may exit directly to an adjacent electronics board for signal communication. In this case, the pair of transverse elemental antennas may be connected indirectly through the electronics board. The pair of transverse elemental antennas 120 may be connected or coupled in different ways to generate different combinations of transverse magnetic moments.

FIG. 4B illustrates transverse elemental antennas 120, with currents I flowing in the antenna wire windings 126 in directions shown by the arrows, which generate transverse magnetic moments $M_T$ in the same transverse direction. In this configuration, the transverse antenna moments $M_T$ may be additive to each other and the pair of transverse antennas 120 produce a composite transversal antenna with its effective center on the tool axis. That is, the pair of elemental antennas shown in FIG. 4B are connected in series so that signals from each are added to form a stronger signal (e.g., a composite transverse moment=$2M_T$).

Figure 4C:
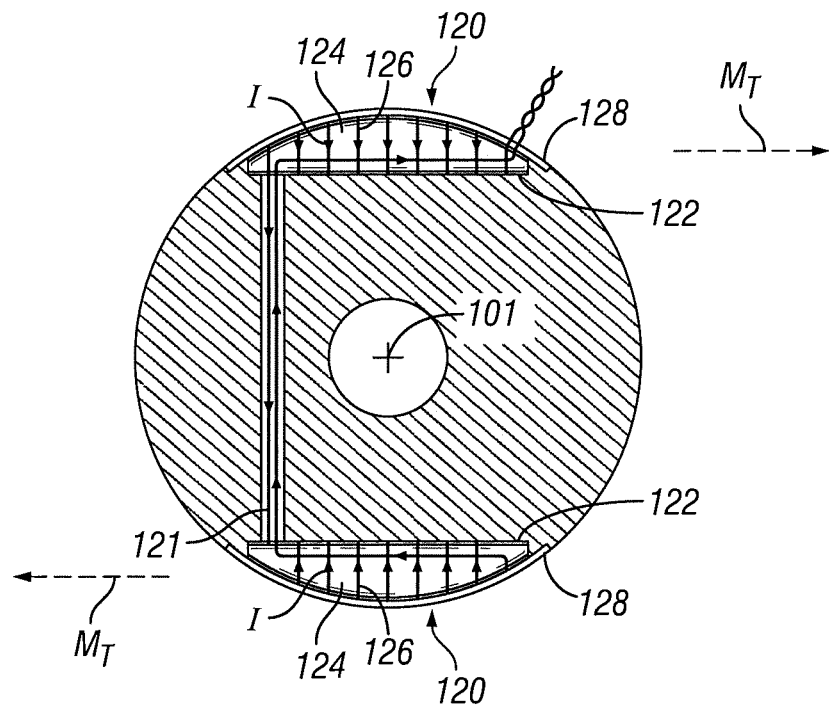

FIG. 4C illustrates transverse elemental antennas 120, with currents I flowing in the antenna wire windings 126 in direction shown by the arrows, which generate transverse magnetic moments $M_T$ in opposite transverse directions. A composite transverse antenna in this configuration will not produce any significant transverse magnetic moment component (e.g., a composite transverse moment≈0). Rather, the resulting magnetic moments may resemble a quadrupole. An electrical current flowing in the tool's longitudinal direction will produce a magnetic field circulating around the collar. The magnetic fields on the opposite sides of the collar will point to opposite azimuthal directions when viewed in a Cartesian coordinate system, which will produce a response in the quadrupole antenna.

Figure 4D:
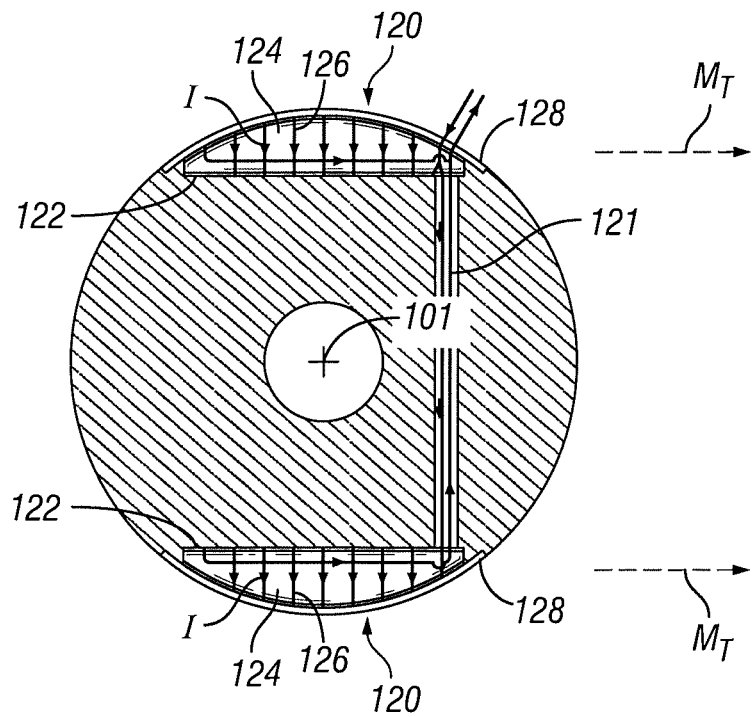

FIG. 4D illustrates transverse elemental antennas 120, with currents I flowing in the antenna wire windings 126 in directions shown by the arrows, which generate transverse magnetic moments $M_T$ in the same transverse direction, similar to FIG. 4B. However, the antennas shown in FIG. 4D are electrically connected in parallel. Therefore, transverse magnetic moments $M_T$ are not added (e.g., a composite transverse moment=$M_T$), however if one antenna fails the other still provides the same signal strength. That is, transverse elemental antennas electrically connected in parallel provide redundancy in case one antenna fails, the composite antenna will still have the same moment as if there was no failure.

Figure 5:
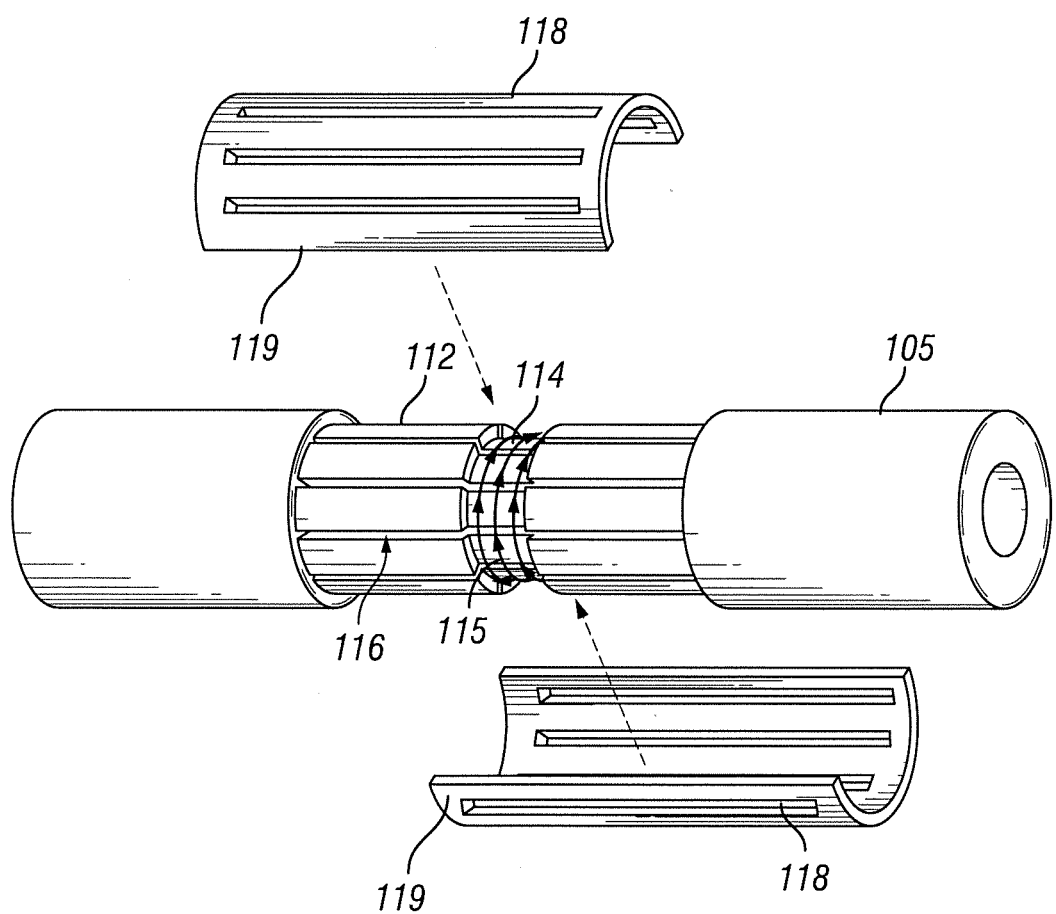
FIG. 5 illustrates an embodiment of axial antenna components.

FIG. 5 illustrates an embodiment of axial antenna components. An antenna groove 112 may be formed in an outer surface of the tool body 105. The width of the antenna groove 112 may be at least one-half inch or up to eight inches or greater, but preferably between one inch and six inches measured along the longitudinal direction of the collar. A depth of the antenna groove 112 may be at least 0.05 inches, at least 0.1 inches, at least 0.25 inches, at least 0.5 inches, at least one inch, or greater. A wire groove 114 may be formed in an outer surface and near the center of the antenna groove 112. The wire groove 114 should be wide and deep enough to hold one or multiple turns of antenna wire 115. Individual wire ways may also be created to hold each turn of wire in place. Longitudinal slots 116 may be formed in an outer surface of the antenna groove 112 for passage of electromagnetic wave energy, and may be referred to as passage slots. The passage slots 116 may be at least 0.25 inches deep, or at least 0.5 inches deep, or at least one inch deep, depending on the size of the collar. The passage slots 116 may be separated from each other by at least approximately 0.25 inches, or at least 0.5 inches, or at least one inch, or at least two inches, or greater. One or multiple turns of antenna wire 115 may be disposed in the wire groove 114. The antenna wire 115 may exit the antenna groove through pressure sealed connectors to a pressure-sealed pocket (not shown) near the antenna groove 112.

An antenna shield 118 may be placed on top of the antenna groove 112 to cover the antenna wire. The antenna shield 118 may be made of the same material as the collar body 105 or a different, preferably harder, material (e.g., stellite) to protect the antenna wire from being damaged during drilling. The antenna shield 118 may include two or more cylindrical pieces, each having multiple slots 119 formed within. The shield slots 119 may be aligned with the passage slots 116 formed in the antenna groove 112. The shield slots 119 may be at least 0.05 inches wide, or at least 0.1 inches wide, or at least 0.5 inches wide, or at least one inch wide, but are preferably within 0.1 to 0.5 inches wide and do not have to be the same width as the underneath passage slots. The thickness of the shield may be at least 0.05 inches, or at least 0.1 inch, or at least 0.25 inches, or at least 0.5 inches, or at least one inch, or greater. The shield 118 may be secured or locked to the collar body 105 either through welding or by bolts. Further, the antenna body may be vacuumed and potted with non-conducting material for integrity and damage protection. The surface of the antenna may be polished to remove any outstanding material.

Figure 6A:
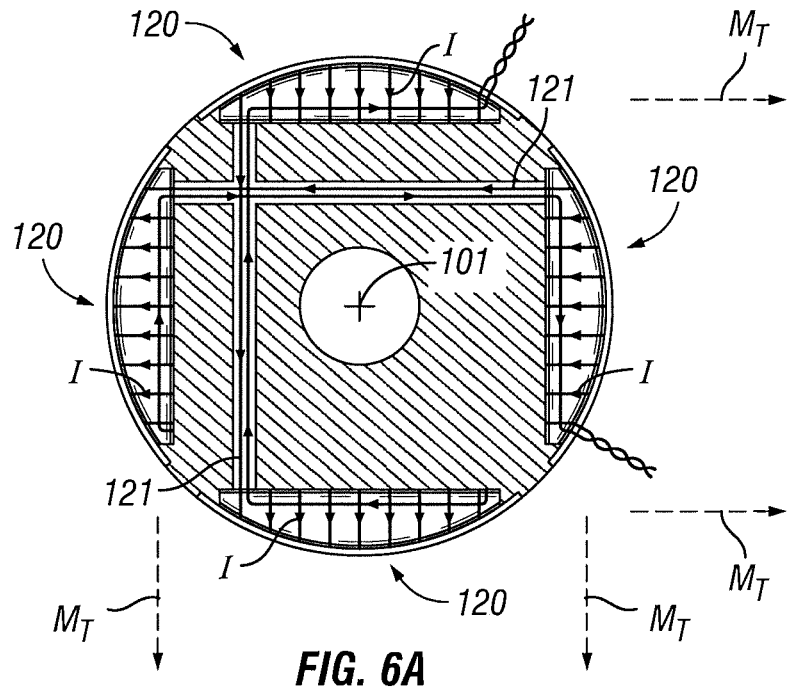
FIGS. 6A-C illustrate embodiments of co-located antennas.
Figure 6B:
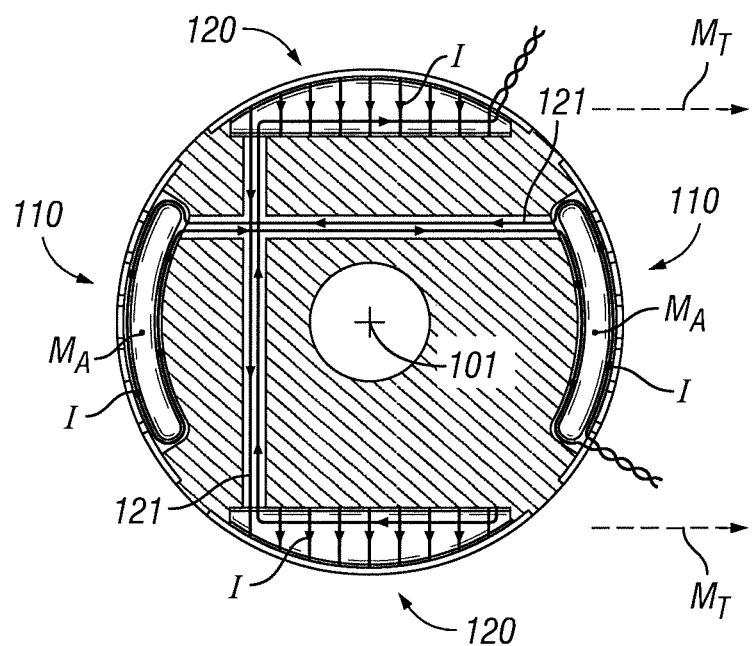
Figure 6C:
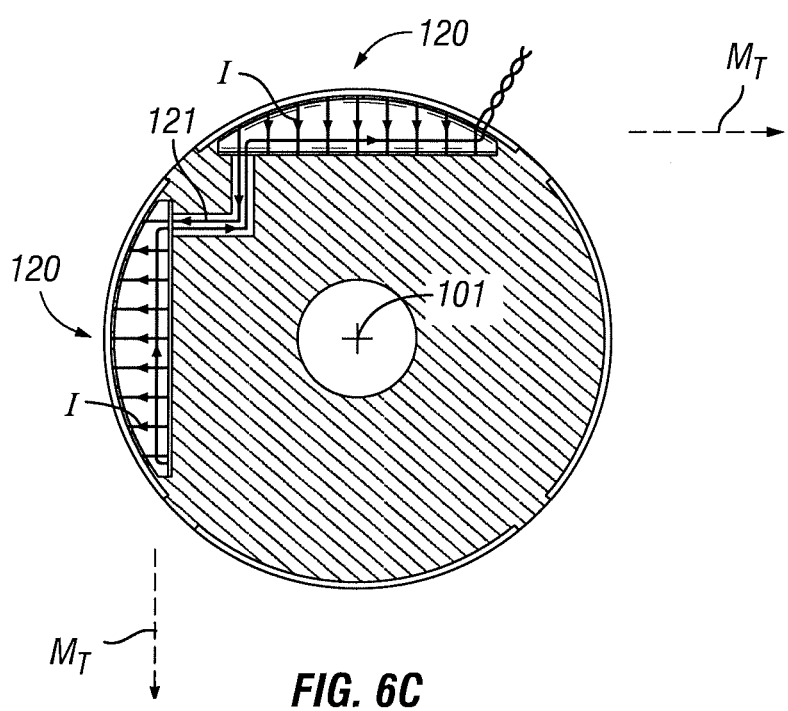

FIGS. 6A-C illustrate embodiments of co-located antennas in the drill collar body. FIG. 6A illustrates an embodiment of co-located transverse antennas, each including a pair of transverse elemental antennas 120 connected as discussed in reference to FIGS. 4A-D. The pairs of transverse antennas generate magnetic moments $M_T$ in the same direction, although any of the composite transverse antenna arrangements may be configured. Connecting wires 121 and wire ways between the pairs of transverse elemental antennas 120 preferably do not intercept, and each transverse elemental antenna 120 transmits or receives electromagnetic energy independently. FIG. 6B illustrates an embodiment of co-located transverse elemental antennas 120 and axial antennas 110. The pair of transverse antennas 120 generate magnetic moments $M_T$ in the same direction, although any of the composite transverse antenna arrangements may be configured. The pair of axial antennas 110 generate magnetic moments $M_A$ in either direction. The axial antenna 110 includes two axial elemental antennas spaced apart by 180 degrees in the azimuthal direction and connected by a wire way for wire passage 121. The wire ways preferably do not intercept each other. In certain instances, the axial antenna may include a single axial antenna, in which case no wire way will be needed.

Various methods of making azimuthal resistivity measurements with and without tool rotation are disclosed. One purpose of azimuthal resistivity measurements is generating information for resolution of the azimuthal direction of and distance to an adjacent boundary near the wellbore. This may be accomplished with one axial transmitting antenna and one elemental transversal receiving antenna. While the transmitting antenna is firing, a signal is acquired from the receiving antenna as the tool rotates. In the presence of a bed boundary near the wellbore and assuming that the boundary is azimuthally located at a tool face angle of $\phi_0$, the signal measured will vary with tool face angle as:

$$A(\phi) = A_0 \cos(\phi + \phi_0) \quad (1)$$

where $A_0$ is the maximum (in the absolute value) value of the azimuthal signal when the transversal receiver antenna points toward the boundary, i.e., at the tool face angle $\phi_0$ and $\phi$ is tool face angle. In equation (1), $A_0$ depends on the resistivities of both the near and the remote beds, distance to the boundary, coil spacing, frequency, antenna moments, and the driving current in the transmitting antenna. Solving equation (1) for $A_0$ and $\phi_0$ requires at least two independent measurements, which may be accomplished by taking measurements at two or more distinct tool face angles. It may be expressed as:

$$A_1 = A_0 \cos(\phi_1 + \phi_0) + e_1 \quad (2)$$

$$A_2 = A_0 \cos(\phi_2 + \phi_0) + e_2 \quad (3)$$

$$A_n = A_0 \cos(\phi_n + \phi_0) + e_n \quad (4)$$

In equations (2)-(4), $e_1, e_2, \ldots e_n$ are measurement errors, and the equations may be solved in the least-square sense which is well known.

In the case where the tool does not rotate, multiple transverse antennas are used to generate independent measurements at different tool face angles. For example, two transverse elemental antennas separated by 90 degrees in the azimuthal direction, may be used. They are preferably located at the same longitudinal position on the tool axis but this is not necessary. Measurements from each antenna may be written as:

$$A_1 = A_0 \cos(\phi_1 + \phi_0) + e_1 \quad (5)$$

$$A_2 = A_0 \cos(\phi_1 + 90 + \phi_0) + e_2 = A_0 \sin(\phi_1 + \phi_0) + e_2 \quad (6)$$

Equations (5)-(6) may be solved for $A_0$ and $\phi_0$ using a least squares methods. Here, in a cross-section view, the magnetic moments generated by the two transversal antennas are assumed to be orthogonal to each other, although not necessary. In general, the two transverse elemental antennas may be separated in the azimuthal direction by any angle between 0° and 360°. In this case, equations (5)-(6) becomes:

$$A_1 = A_0 \cos(\phi_1 + \phi_0) + e_1 \quad (7)$$

$$A_2 = A_0 \cos(\phi_1 + \Delta\phi + \phi_0) + e_2 \quad (8)$$

where $\Delta\phi$ is the azimuthal angle separation between the two antennas.

For the special case of equations (5)-(6) and in the absence of measurement noises, both $A_0$ and $\phi_0$ may be computed as:

$$A_0 = (A_1^2 + A_2^2)^{1/2} \quad (9)$$

$$\phi_0 = \tan^{-1}\left(\frac{A_2}{A_1}\right) \quad (10)$$

For the general case of equations (7)-(8), inversion must be applied to compute $A_0$ and $\phi_0$.

If multiple transverse elemental antennas are used that are located at substantially the same longitudinal position on the tool axis, it is possible to form a virtual transversal antenna by combining the multiple transversal antennas. The combination may be done either by electrically connecting the antennas together or by adding their responses together, examples of which were discussed in reference to FIGS. 4A-D. For instance, if two transverse elemental antennas are separated by an azimuthal angle $A\phi$, then their combined response:

$$A = A_1 \cos(\phi + \phi_0) + A_2 \cos(\phi + \Delta\phi + \phi_0) = B \cos(\phi + \phi') \quad (11)$$

is another cosine function of the tool face angle. In the above, $$B = (A_1^2 + A_2^2 + 2A_1 A_2 \cos\Delta\phi)^{1/2} \quad (12)$$

$$\phi' = \tan^{-1}\left(\frac{A_1 \sin\phi_0 + A_2 \sin(\phi_0 + \Delta\phi)}{A_1 \cos\phi_0 + A_2 \cos(\phi_0 + \Delta\phi)}\right) \quad (13)$$

Advantageously, combined antennas or signals over individual antennas or signals may lead to better noise rejection and improved signal-to-noise ratios. And, if one of the antennas fails, the combined signal will still be usable.

Signals from multiple transverse elemental receiving antennas may be acquired simultaneously when a transmitting antenna fires. The signals may also be acquired sequentially as a transmitting antenna fires, regardless of tool rotation. The tool face angle will be recorded by a sensor while recording the signals. The signals are associated with the tool face measurements in computing a formation parameter of interest. When the tool rotates, measurements from two transverse (e.g., X and Y) elemental receiving antennas as a function of tool face angle will resemble each other, which provides data redundancy. Combining a larger set of measurements may be used for subsequent processing and interpretation, while independently processing measurements from each transverse elemental antenna may be used for quality control purposes, among others.

Cross-component antenna arrangements (e.g., an axial transmitting antenna and a transverse elemental receiving antenna) disclosed herein may be used for making azimuthal resistivity measurements for detection and resolution of an adjacent bed boundary in a formation. However, detection and resolution of adjacent bed boundaries using such cross-component antenna arrangements may oftentimes be affected by formation resistivity anisotropy (e.g., directionally dependent formation properties). That is, formation resistivity anisotropy may produce an anomalous signal similar to that produced by an adjacent bed boundary. The cross-component response to an anisotropic formation may be written as:

$$V_{zx} = \frac{M_T M_R I}{4\pi L^3}\left[\frac{\cos\theta}{\sin\theta}ik_h L\left(e^{ik_h L} - e^{ik_h \beta L}\right)\right] \quad (14)$$

Where $$k_h = (i\omega\mu\sigma_h)^{1/2} \quad (15)$$

$$\beta = \left(\cos^2\theta + \frac{R_h}{R_v}\sin^2\theta\right)^{1/2}$$

In the above equation, $M_T$ and $M_R$ are the effective areas of the transmitting and receiving antennas, respectively, I is the driving current in the transmitting antenna, and $\theta$ is the relative dip angle of the formation relative to the tool axis. If the resistivity anisotropy is produced by lamination of thin beds of different resistivity values, the relative dip angle $\theta$ will be 90 degrees if the wellbore (or tool axis) is parallel to the bedding planes. $V_{zx}$ will be nonzero as long as the relative dip angle $\theta$ is different from 0 or 90 degrees. As determined from equation (14), the cross-component signal $V_{zx}$ will remain the same if the relative dip angle changes by 180 degrees. Therefore, an axial transmitting antenna located longitudinally on one side of the receiving antenna will produce the same response as if the transmitting antenna is moved to the other side of the receiving antenna at a symmetrical position and driven with the same driving current. Hence, a signal response due to an anisotropic formation may be removed by subtracting the responses generated by two longitudinally symmetrical transmitting antennas. In contrast, the responses produced at an adjacent bed boundary due to two longitudinally symmetrical transmitting antennas will have opposite signs if the axial magnetic moments of the transmitting antennas point in the same longitudinally direction. Hence, subtracting the two responses from each other will enhance the bed boundary response.

A method of data acquisition is disclosed for suppressing certain formation parameters while amplifying others, which includes firing two transmitting antennas at least substantially simultaneously. Currents may be driven simultaneously to two transmitting antennas for generating axial magnetic moments in opposite directions, thereby inducing a voltage signal in the wire winding of the receiving antenna related to a parameter of an adjacent formation bed boundary (and reducing or cancelling the formation resistivity anisotropy effect). Alternatively, currents may be driven simultaneously to two transmitting antennas for generating axial magnetic moments in the same direction, thereby inducing a voltage signal in the wire winding of the receiving antenna related to a parameter of formation resistivity anisotropy (and reducing or cancelling the bed boundary effect).

Simultaneously driving currents to the two transmitting antennas produces a stronger signal and greater signal-to-noise ratio (SNR) than sequentially driving currents to transmitting antennas at the same power input. As an example, for total data acquisition time of T, and $V_0$ indicating the voltage signal detected by a receiving antenna for a unit driving current in a transmitting antenna, the power consumption by the transmitting antenna may be written as:

$$P = I^2 R \quad (16)$$

where R is the total resistance of the antenna, i.e., the sum of the antenna wire resistance and the antenna radiation resistance. Noise in the received signal may be assumed to be random and stacking of data will result in reduction in noise according to:

$$n = cn_0/\sqrt{t} \quad (17)$$

where $n_0$ is the noise level without any stacking, t is the acquisition time, and c is a proportionality constant. For sequential acquisition, the signal level is calculated by:

$$V_1 = V_0\sqrt{\frac{P}{R}} \quad (18)$$

Combining the two sequential measurements will result in a signal-to-noise (SNR) ratio for the combined signal calculated by:

$$SNR_1 = \frac{V_0\sqrt{PT/R}}{cn_0} \quad (19)$$

Similarly, for simultaneous acquisition, the total signal level is calculated by:

$$V_1 = V_0\sqrt{\frac{2P}{R}} \quad (20)$$

The corresponding SNR is calculated by:

$$SNR_2 = \frac{V_0\sqrt{2PT/R}}{cn_0} = \sqrt{2}\,SNR_1 \quad (21)$$

As shown, the SNR for simultaneous acquisition is increased by a factor of $\sqrt{2}$ over sequential acquisition for the same input power. After binning the measurements made at multiple tool face angles into a number of sectors, the SNR for each sector will be less than that for the entire data combined. However, the relative gain in the SNR for each sector with simultaneous acquisition will remain the same as compared to sequential acquisition. In simultaneous acquisition, the two antennas preferably have the same effective cross-sectional area and are driven with currents of the same magnitude. If they have different effective cross-sectional areas, the driving currents then must be adjusted such that the products of the effective cross-sectional area and the driving current are the same.

Figure 7:
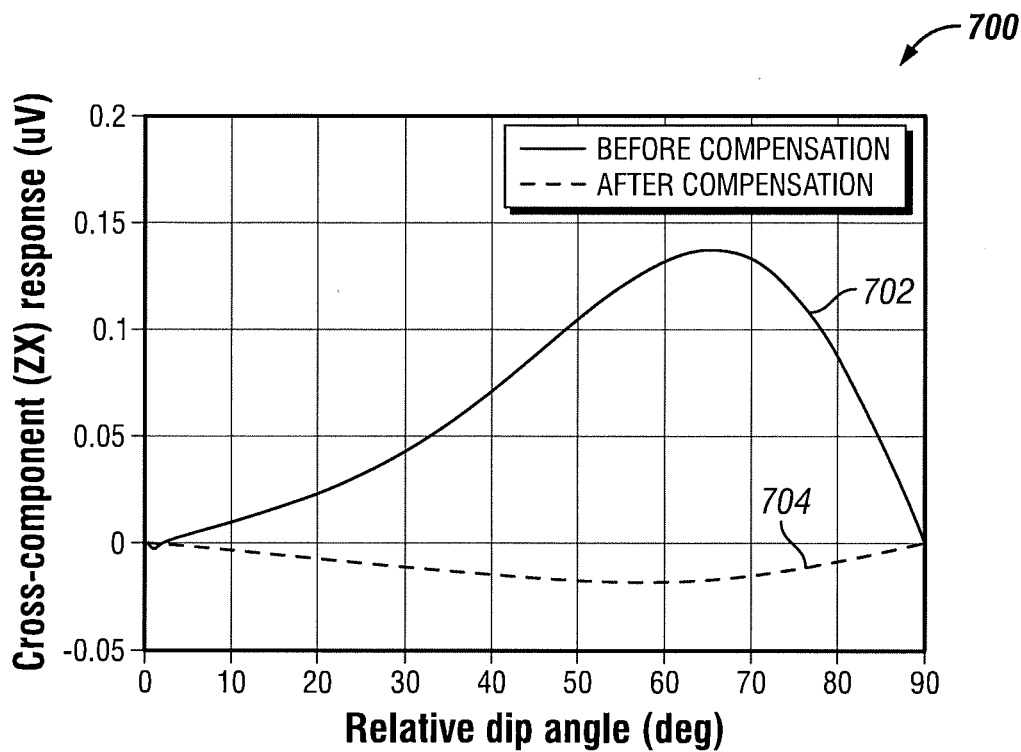
FIG. 7 illustrates a graph showing measured signal responses due to an anisotropic formation with and without measurement compensation.

In the above discussion, the two transmitting antennas are substantially equally spaced apart from the receiving antenna(s). In instances where the two transmitting antennas have different spacings from the receiving antenna(s), additional methods for compensating for formation anisotropy effect are disclosed. In a first method, the two signals may be measured, with either sequential data acquisition or simultaneous data acquisition, and subtracted. Subtracting the signals may work if the coil spacing is small. As an example, coil spacing may be less than ten inches or less than twenty inches. In other examples, coil spacing may be twenty inches or greater. FIG. 7 illustrates a graph 700 showing signal responses due to an anisotropic formation, an uncompensated signal response 702 and compensated signal response 704 using the first method. The parameters are: Rh=1 ohmm, Rv=5 ohmm, θ=100°, L₁=40 in., L₂=38 in., and f=2 MHz. The compensated signal is defined as:

$$V_{zx}^{Comp} = \frac{1}{2}(V_{zx1} - V_{zx2}) \quad (22)$$

A coefficient of ½ is included so that after the compensation the bed boundary response remains the same (if the bed boundary is parallel to the tool axis). As shown, the first compensation method reduces the anisotropy effect by a factor of approximately 9.1, which represents a great reduction in the anisotropy effect.

In a second method, equation (22) is corrected by adjusting the scaling factor L (see equation (14)) to further compensate for the formation anisotropy effect. The two individual signals may be combined as follows to produce a new compensated signal:

$$V_{zx}^{Comp} = \frac{1}{L_1^3 + L_2^3}(V_{zx1}L_1^3 - V_{zx2}L_2^3) \quad (23)$$

Figure 8:
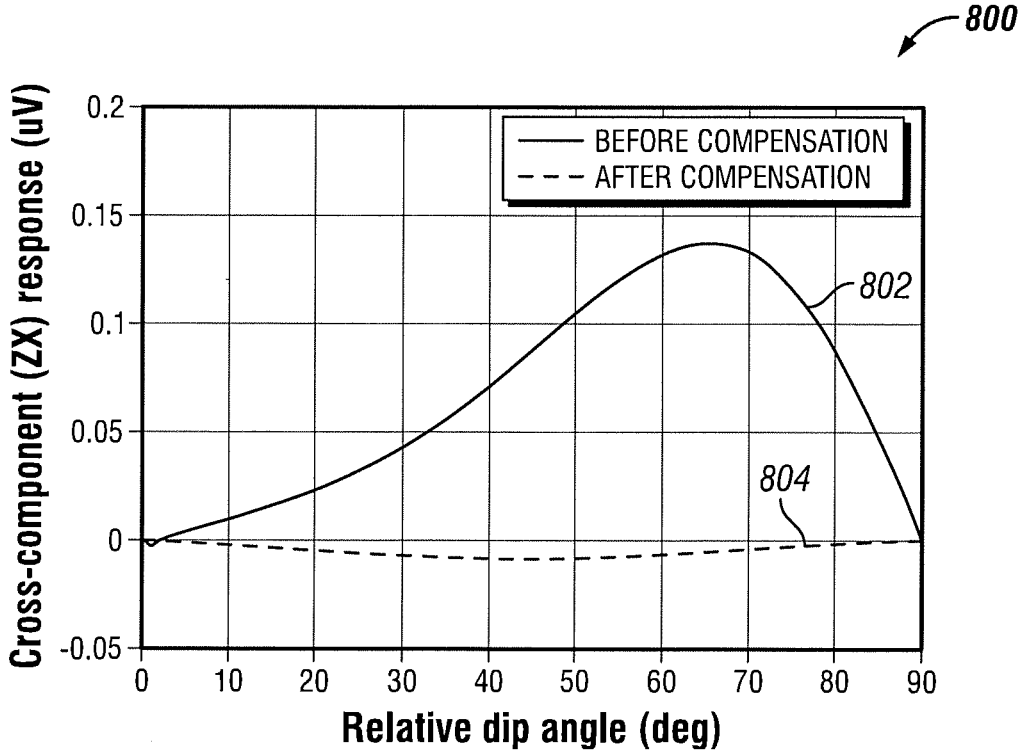
FIG. 8 illustrates a graph showing measured signal responses due to an anisotropic formation with and without measurement compensation.

As shown, equation (23) reduces to equation (22) if $L_1=L_2$. FIG. 8 illustrates a graph 800 showing signal responses due to an anisotropic formation, an uncompensated signal response 802 and compensated signal response 804 using the second method according to equation (23). The second compensation method reduces the anisotropy effect by a factor of approximately 16.3, nearly doubling that of the first compensation method. Equation (23) may also be implemented for simultaneous data acquisition. To do so, the currents in the two transmitter antennas are scaled by factors of $L_1^3/(L_1^3+L_2^3)$ and $L_2^3/(L_1^3+L_2^3)$, respectively.

In a third method, the anisotropy effect is directly removed from signal measurements by numerically computing the anisotropy effect using equation (14). In the equation, the two unknown parameters Rh and β may be calculated from the propagation resistivity measurements. The relative dip angle θ must be input from other sources, e.g., the well deviation angle and the known formation dip angle.

An azimuthal resistivity measurement tool acquires data at multiple tool face angles, which may be regularly or irregularly distributed in the tool face domain, depending on the rotation speed of the tool. It is often desirable that the data acquired over a certain period of time is partitioned or "binned" into sectors. A method of data binning is disclosed. To illustrate, it may be assumed that a total of M sectors are formed to cover the entire tool face angle range of 0° to 360°. For the k-th sector $\phi=[\phi_k, \phi_{k+1}]$, it may be assumed that the sector contains N data points, $d_i$, for $1 \leq i \leq N$, with corresponding tool face angles $\phi_i$. The uncertainty in the tool face angle measurement for each data point may be defined by a fidelity function $g(\phi)$. The fidelity function may be different from zero only over a finite tool face angle range. For simplicity, the fidelity function may be assumed to be the same for all data points, although this is not necessary. Three scenarios may occur: (1) the fidelity function associated with a data point is contained entirely within a sector, (2) the fidelity function is partly contained in a sector, and (3) the fidelity function is completely outside a sector. Equation (24) best applies to cases where the data points are associated with evenly distributed tool face angles. Mathematically, this may be expressed as:

$$D_k = \frac{\sum_i w_i d_i}{\sum_i w_i} \quad (24)$$

In the above, $D_k$ is the binned data for the k-th sector and $$w_i = \int_{\phi_{k-1}}^{\phi_k} g(\phi - \phi_i) d\phi \quad (25)$$

The selection of a fidelity function for binning data must consider the sensor response characteristics and other hardware and software factors. If the sensor accuracy follows a Gaussian distribution, then the fidelity function may reasonably be taken as the Gaussian function. Binning methods disclosed herein provide that any data points close to the boundary between two adjacent sectors contribute to the binned values of both adjacent sectors. That is, when a data point resides on the boundary between two adjacent sectors, methods disclosed split the data value into the two adjacent sectors. When a data point falls in one sector but is within a range of uncertainty to the sector border with an adjacent sector, the data point will be assigned to both adjacent sectors with different weights, yielding a smooth transition between the two sectors. For example, the range of uncertainty may be within at least one degree of the tool face angle, or at least within three degrees of the tool face angle, or at least within five degrees of the tool face angle, or greater.

Figure 9:
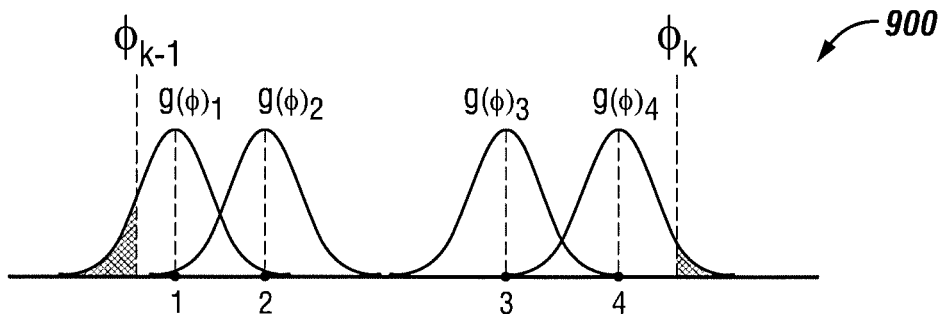
FIG. 9 illustrates a fidelity function related to an embodiment of data binning methods.

FIG. 9 illustrates a plot 900 showing data points with associated fidelity functions. In plot 900, four data points (1, 2, 3, and 4) are illustrated along with their respective fidelity functions $g(\phi)$. A weighted average value is to be computed and assigned to a sector starting at a tool face angle $\phi_{k-1}$ and ending at the tool face angle $\phi_k$. Data points 1 and 4 are close to the sector lines and their respective fidelity function curves cross the left and right sector lines, respectively. Data points 2 and 3 have their respective fidelity functions fully contained between the two sector lines. As a result, data points 1 and 4 make full contributions to the average data value assigned to the sector, whereas data points 2 and 3 make full contributions. The weight for each data points is calculated from equations (27)-(29).

Figure 10:
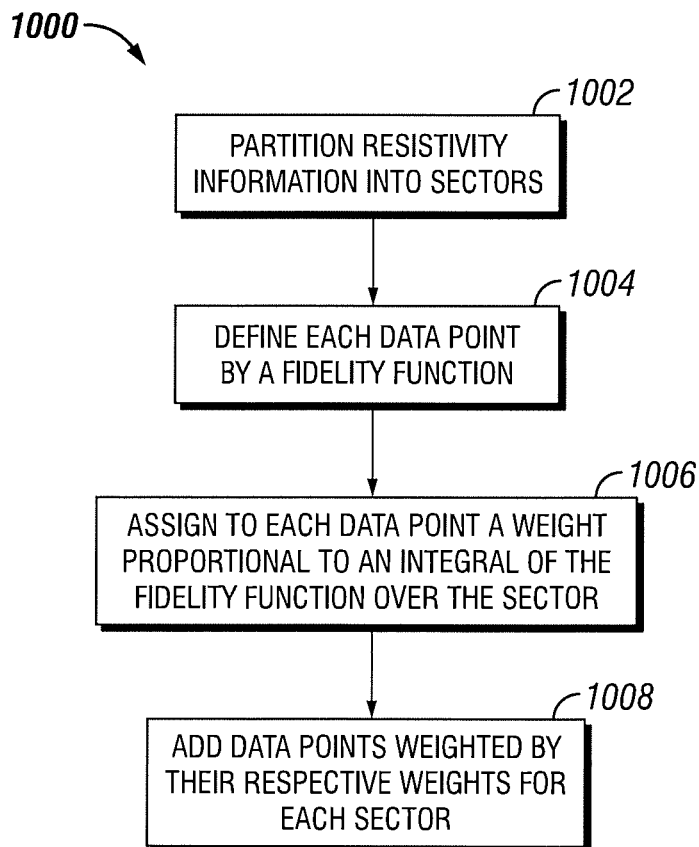
FIG. 10 illustrates a flowchart showing an embodiment of a data binning method.

FIG. 10 illustrates a flow chart showing steps of binning methods disclosed herein. Step (1002) indicates partitioning resistivity information acquired at multiple tool body angles into M number of sectors. Step (1004) indicates defining each data point of the resistivity information by a fidelity function $g(\Phi)$. Step (1006) indicates assigning to each data point a weight for each of the M number of sectors, wherein the weight is proportional to an integral of the fidelity function $g(\Phi)$ over the sector. Step (1008) indicates adding the data points weighted by their respective weights for each of the M sectors.

Data points will generally be unevenly distributed in tool face angles and should be assigned with tool-face dependent weights in computing a binned value. As an example, the data weight for the i-th data point may be computed as:

$$u_i = \frac{\phi_{i+1} - \phi_{i-1}}{2(\phi_k - \phi_{k-1})} \quad (26)$$

In using equation (26), data points falling in the k-th sector are first scaled according to the equation:

$$d_i^* = \frac{w_i d_i}{w_0} \quad (27)$$

Where:

$$w_0 = \int_{-\infty}^{\infty} g(\phi) d\phi \quad (28)$$

The binned data value is then calculated as:

$$D_k = \frac{\sum_i u_i d_i^*}{\sum_i u_i} \quad (29)$$

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

What is claimed is:

1. A tool comprising:
a tool body;
a receiving antenna configured to be disposed within a pocket of a tool body wherein the receiving antenna comprises:
an antenna body having a longer axis configured to be disposed longitudinally in the tool body; and
a wire coil configured to generate a magnetic moment wherein the wire coil has a central axis disposed around the antenna body and wherein the wire coil central axis is angled with respect to the longer axis of the antenna body,
wherein the receiving antenna is configured to receive a voltage signal related to a parameter of a geologic formation;
wherein the tool further comprises an antenna shield configured to be placed over the pocket of the tool body;
and wherein the tool body has an outer perimeter and wherein the pocket is formed within only a portion of the outer perimeter.

2. The tool of claim 1, wherein the receiving antenna is disposed within a pocket extending radially inward from an outer surface of the tool body.

3. The tool of claim 2, further comprising a non-conducting material disposed within the pocket beneath and around the wire winding.

4. The tool of claim 2, further comprising a magnetic material disposed within the pocket beneath and around the wire winding.

5. The tool of claim 2, wherein the pocket extends radially inward from the outer surface a maximum radial depth of approximately one inch.

6. The tool of claim 2, wherein the pocket extends axially a maximum of approximately ten inches along the longitudinal axis.

7. The tool of claim 2, further comprising an antenna shield having openings therein covering the antenna body and wire winding within the pocket and attached to the tool body.

8. The tool of claim 7, wherein the openings in the antenna shield are curved.

9. The tool of claim 1, further comprising multiple receiving antennas proximate to the outer surface of the tool body and azimuthally-spaced around a circumference of the tool body.

10. The tool of claim 9, wherein the multiple receiving antennas are azimuthally-spaced at or less than 180 degrees apart.

11. The tool of claim 9, wherein the multiple receiving antennas are connected in series or parallel.

12. The tool of claim 1, further comprising a transmitting antenna.

13. The tool of claim 12, wherein the transmitting antenna comprises a wire winding that is symmetric about the longitudinal axis of the tool body.

14. The tool of claim 1, further comprising a sensor configured to measure the angular position of the tool body relative to the wellbore.

15. The tool of claim 1, further comprising a transmitting antenna configured to induce the voltage signal related to a parameter of the geologic formation that is received by the receiving antenna.

16. The tool of claim 1, wherein the antenna body comprises wire grooves configured to hold the wire in place.

17. The tool of claim 1, wherein the antenna shield comprises one or more openings.

18. The tool of claim 1, wherein the antenna shield is configured to be attached to the tool body with bolts.

* * * * *